United States Patent
Jiang et al.

(10) Patent No.: US 11,796,647 B2
(45) Date of Patent: Oct. 24, 2023

(54) METHOD AND APPARATUS FOR DETECTING AN OBJECT USING OPTICAL PULSES WITH NON-UNIFORM POWER

(71) Applicants: Zhiping Jiang, Kanata (CA); Ali Ahmed Ali Massoud, Kanata (CA)

(72) Inventors: Zhiping Jiang, Kanata (CA); Ali Ahmed Ali Massoud, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 555 days.

(21) Appl. No.: 16/889,582

(22) Filed: Jun. 1, 2020

(65) Prior Publication Data
US 2021/0373136 A1     Dec. 2, 2021

(51) Int. Cl.
*G01S 7/4865*     (2020.01)
*G01S 17/10*     (2020.01)
*G01S 7/481*     (2006.01)
*G01S 17/894*     (2020.01)

(52) U.S. Cl.
CPC .......... *G01S 7/4865* (2013.01); *G01S 7/4817* (2013.01); *G01S 17/10* (2013.01); *G01S 17/894* (2020.01)

(58) Field of Classification Search
None
See application file for complete search history.

(56) References Cited

U.S. PATENT DOCUMENTS

| | | | |
|---|---|---|---|
| 2017/0153319 A1 | 6/2017 | Villeneuve et al. | |
| 2018/0284237 A1* | 10/2018 | Campbell | G01S 17/931 |
| 2018/0284244 A1* | 10/2018 | Russell | G01S 7/497 |

FOREIGN PATENT DOCUMENTS

| | | | |
|---|---|---|---|
| WO | 2004073172 A3 | 12/2004 | |
| WO | 2018044958 A1 | 3/2018 | |

OTHER PUBLICATIONS

Australian/New Zealand Standard™ "Safety of laser products Part 1: Equipment classification and requirements", Standards Australia Limited/Standards New Zealand, Sydney, 2014.

* cited by examiner

*Primary Examiner* — Heather R Jones

(57) ABSTRACT

There is provided a method and apparatus for detecting an object, especially an object remotely placed in a field of view (FOV) using optical pulses with non-uniform pulse power, without exceeding the Accessible Emitted Limit (AEL) A plurality of optical pulses including two or more levels of pulse power may be emitted to detect an object in the FOV. Information related to the object may be generated from the returning optical pulses. The optical pulses with non-uniform pulse power may result in increased probability of detection associated with the pulses returning from the remotely located object, and therefore the density of point clouds associated with the remotely located object may be increased.

21 Claims, 14 Drawing Sheets

FIG. 2C

Table 9 – Correction factors and breakpoints for use in AEL and MPE evaluations

| Parameter | Spectral region nm |
|---|---|
| $C_1 = 5.6 \times 10^3 \, t^{0.25}$ | 180 to 400 |
| $T_1 = 10^{0.8(\lambda - 295)} \times 10^{-15}$ s | 302.5 to 315 |
| $C_2 = 30$ | 180 to 302.5 |
| $C_2 = 10^{0.2(\lambda - 295)}$ | 302.5 to 315 |
| $T_2 = 10 \times 10^{[(\alpha - \alpha_{min})/98.5]}$ s for $\alpha_{min} < \alpha \leq 100$ mrad | 400 to 1 400 |
| $T_2 = 10$ s for $\alpha \leq 1.5$ mrad | 400 to 1 400 |
| $T_2 = 100$ s for $\alpha > 100$ mrad | 400 to 1 400 |
| $C_3 = 1.0$ | 400 to 450 |
| $C_3 = 10^{0.02(\lambda - 450)}$ | 450 to 600 |
| $C_4 = 10^{0.002(\lambda - 700)}$ | 700 to 1 050 |
| $C_4 = 5$ | 1 050 to 1 400 |
| $C_5 = 1^a$ | 180 to 400 and 1 400 to $10^6$ |
| $C_5 = N^{-1/4}$ ª | 400 to 1 400 |
| $C_6 = 1$ | 180 to 400 and 1 400 to $10^6$ |
| $C_6 = 1$ for $\alpha \leq \alpha_{min}$ ᵇ | 400 to 1 400 |
| $C_6 = \alpha/\alpha_{min}$ for $\alpha_{min} < \alpha \leq \alpha_{max}$ ᵇ | 400 to 1 400 |
| $C_6 = \alpha_{max}/\alpha_{min}$ for $\alpha > \alpha_{max}$ ᵇ,ᶜ | 400 to 1 400 |
| $C_7 = 1$ | 700 to 1 150 |
| $C_7 = 10^{0.018(\lambda - 1 150)}$ | 1 150 to 1 200 |
| $C_7 = 8 + 10^{0.04(\lambda - 1 250)}$ | 1 200 to 1 400 |

$\alpha_{min} = 1.5$ mrad $\alpha_{max} = 5$ mrad for $t < 625$ μs
200 $t^{0.5}$ mrad for 625 μs $\leq t \leq 0.25$ s
100 mrad for $t > 0.25$ s $N$ is the number of pulses contained within the applicable duration (4.3 f) and Clause A.3).

NOTE 1  There is only limited evidence about effects for exposures of less than $10^{-9}$ s for wavelengths less than 400 nm and greater than 1 400 nm. The AELs for these emission durations and wavelengths have been derived by calculating the equivalent radiant power or irradiance from the radiant power or radiant exposure applying at $10^{-9}$ s for wavelengths less than 400 nm and greater than 1 400 nm.

NOTE 2  See Table 10 for aperture stops and Table A.4 for limiting apertures.

NOTE 3  In the formulae in Tables 3 to 8 and in these notes, the wavelength is expressed in nanometres, the emission duration $t$ is expressed in seconds and $\alpha$ is expressed in milliradians.

NOTE 4  For emission durations which fall at the cell border values (for instance 10 s) in Tables 3 to 8, the lower limit applies. Where at cell borders (i.e. not applying to explicit equations) the symbol "<" is used, this means less than or equal to. When wavelength ranges are specified, wavelength range $\lambda_1$ to $\lambda_2$ means $\lambda_1 \leq \lambda < \lambda_2$.

ª  $C_5$ is only applicable to pulse durations shorter than 0.25 s. See rules to determine $C_5$ in 4.3 f).
ᵇ  $C_6$ is only applicable for thermal retinal limits.
ᶜ  The maximum limiting angle of acceptance $\gamma_{th}$ shall be equal to $\alpha_{max}$ (but see 4.3 c)).

FIG. 2D

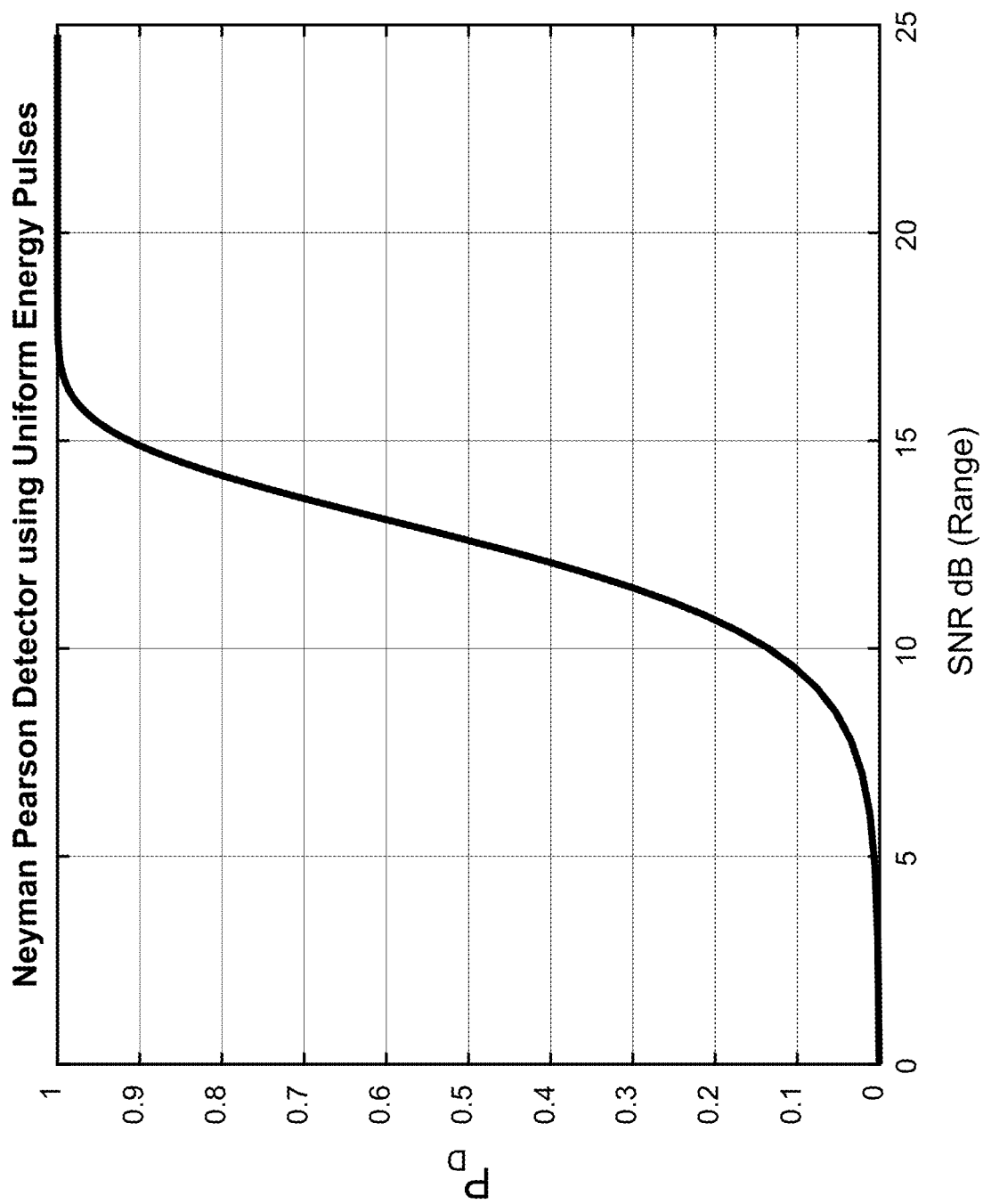

METHOD AND APPARATUS FOR DETECTING AN OBJECT USING OPTICAL PULSES WITH NON-UNIFORM POWER

FIELD OF THE INVENTION

The present invention pertains to object scanning scheme and in particular to a method and apparatus for detecting an object in a field of view using optical pulses with non-uniform pulse power.

BACKGROUND

Advanced Driver Assistance System (ADAS), an electronic system that assists a vehicle driver while driving or during parking, has been developed in the automotive industry to automate, adapt or enhance vehicle systems for safe and easy driving. ADAS has gained more attentions from the automotive industry upon development of self-driving cars. ADAS employs a suite of sensors to detect and classify various objects in the defined field of view (FOV). One of the sensors used by ADAS is the light detection and ranging (Lidar) sensor.

The time of flight (TOF) Lidar sensor emits laser pulses and receives the light pulses returning or backscattering from the target object. Thus, TOF Lidar can calculate the distance of the target object using time difference between the emission time and the reception time having regard to the emitted light pulse.

According to the TOF Lidar equation, the power of the light pulses returning or backscattering from the target object is inversely proportional to the distance to the target object squared. Indeed, it is more challenging to detect an object in a long distance (e.g. an object remotely located from the sensor) due to low signal-to-noise ratio (SNR). As such, it is desired to increase the power of the light pulse to boost the SNR, especially for detecting objects in long distances. However, the power of the laser pulses emitted from the TOF Lidar cannot exceed a certain power level (e.g. admissible exposure limit (AEL)), due to eye safety. Therefore there is a need for a method and apparatus for detecting an object, especially an object located in distance, in the defined field of view (FOV) that is not subject to the limitation described above.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for detecting an object using optical pulses with non-uniform power In accordance with embodiments of the present invention, there is provided method of detecting an object in a field of view (FOV). The method includes emitting a first set of optical pulses, wherein the first set of optical pulses include a first optical pulse having a first pulse power and a second optical pulse having a second pulse power. The first pulse power is different from the second pulse power and a per-pulse power of the first set of optical pulses is less than or equal to a predefined limit. The method further includes receiving a first set of returning optical pulses, the first set of returning optical pulses indicative of information related to the object in the FOV and generating the information related to the object in the FOV from the first set of returning optical pulses.

In accordance with embodiments of the present invention, there is provided a device for detecting an object in a field of view (FOV). The device includes one or more optical pulse transmitters emitting a plurality of optical pulses including a first optical pulse having a first pulse power and a second optical pulse having a second pulse power. The first pulse power is different from the second pulse power and a per-pulse power of the optical pulses is less than or equal to a predefined limit. The device further includes one or more optical pulse receivers for receiving a plurality of returning optical pulses, the returning optical pulses indicative of information related to the object in the FOV. The device additionally includes a processor for generating the information related to the object in the FOV from the returning optical pulses.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present invention may provide higher probability of detecting optical pulses returning from the remotely located object in a field of view (FOV). The increased probability of detection of returning optical pulse would result in higher density of point clouds associated with the remotely located object and therefore the range for detecting an object in an FOV would become longer. Embodiments of the present invention also provide increased probability and enhanced range for detecting objects with low reflectivity or objects in poor weather conditions, such as fog, rain, etc.

BRIEF DESCRIPTION OF THE FIGURES

Further features and advantages of the present invention will become apparent from the following detailed description, taken in combination with the appended drawings, in which:

FIG. 2C illustrates accessible emission limits (AEL) for Class 1 and Class 1M laser products and C6=1 in Australian/New Zealand Standard.

FIG. 2D illustrates correction factors and breakpoints for use in AEL and maximum permissible exposure (MPE) evaluations in Australian/New Zealand Standard.

FIG. 3 illustrates the probabilities of optical pulse detection in respect of various signal-to-noise ratios (SNR).

It will be noted that throughout the appended drawings, like features are identified by like reference numerals.

DETAILED DESCRIPTION

The term "AEL" refers to Accessible Emitted Limit, which is obtained through a complex function which can include variables including wavelength, repetition rate, and pulse width or pulse duration. In this disclosure, the AEL is calculated in accordance with the standard published by the joint Australian/New Zealand Standard in "Safety of laser products Part 1: Equipment classification and requirements", Standards Australia Limited/Standards New Zealand, Sydney, 2014, hereinafter referred to as "Australian/New Zealand Standard".

The instant disclosure describes a method and apparatus for detecting an object, especially an object remotely placed in a field of view (FOV) using optical pulses with non-uniform pulse power, without exceeding a predefined limit, such as AEL According to embodiments of the present invention, the probability of detection associated with optical pulses returning from the remotely located object would be increased. This would result in increase of the density of point clouds associated with the remotely located object, especially compared to when the current techniques are used. In various embodiments, detection of such remotely located objects may be performed using light detection and ranging (Lidar), for example time of flight (TOF) Lidar.

According to embodiments, there is provided a method for detecting an object remotely placed in a FOV. The method includes emitting a first set of optical pulses with non-uniform pulse power. This first set of optical pulses may be emitted by the optical pulse transmitter included in the device for detecting an object in a FOV. The method further includes receiving a first set of returning optical pulses that are returning from interaction with the object. The first set of returning optical pulses may be indicative of information related to the object in the FOV. The method further includes generating information related to the object in the FOV from the first set of returning optical pulses. In some embodiments, the method further includes emitting a second set of optical pulses with non-uniform pulse power and receiving a second set of returning optical pulses. The second set of returning optical pulses may also be indicative of information related to the object in the FOV.

Figure 1:
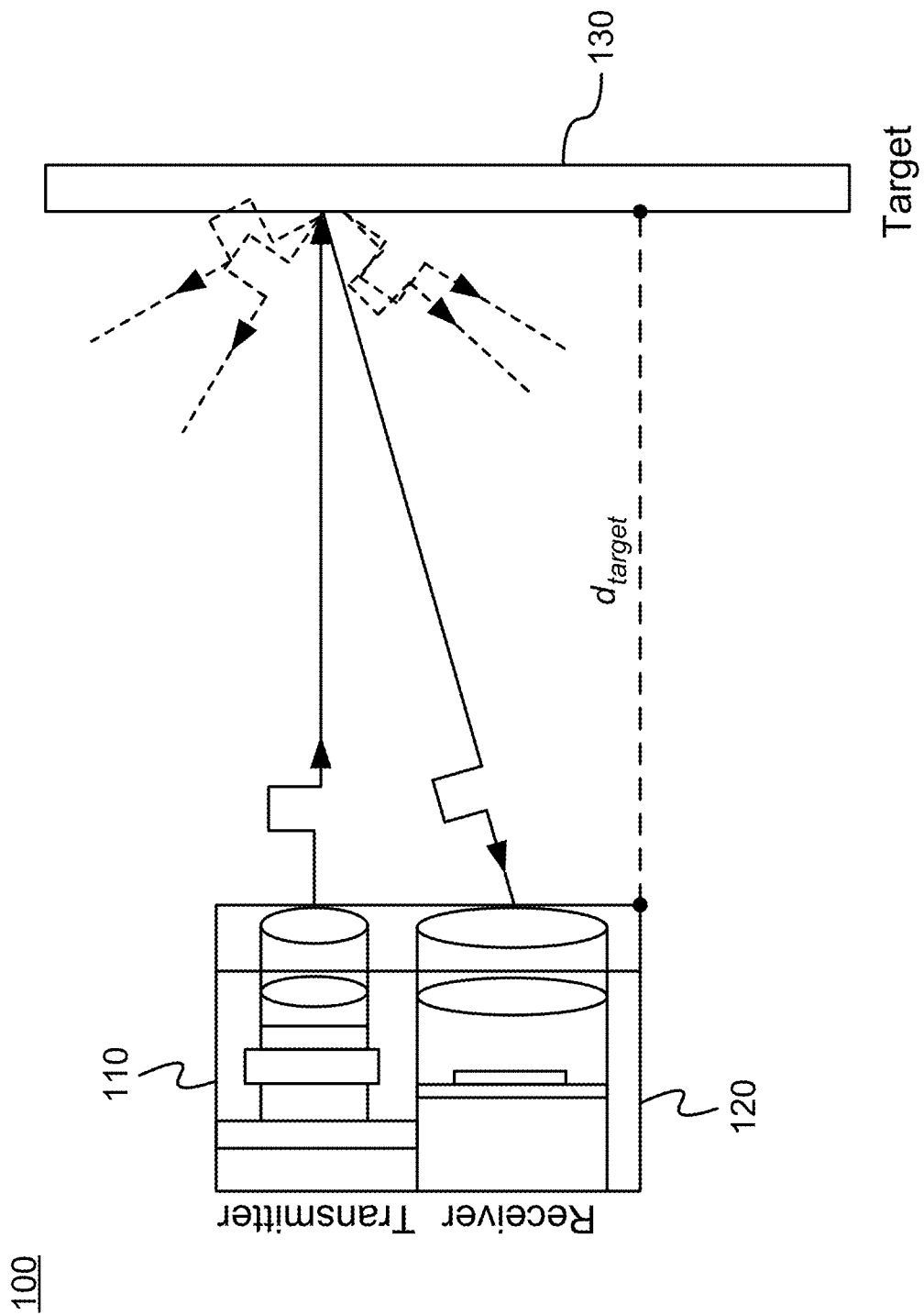
FIG. 1 illustrates the basic principle of the time of flight (TOF) light detection and ranging (Lidar).

FIG. 1 illustrates the basic principle of the time of flight (TOF) light detection and ranging (Lidar). The distance to the target object 130 (i.e. $d_{target}$) can be estimated by measuring the time between the moment that an optical pulse (e.g. laser pulse) is emitted at the transmitter 110 and the moment that the optical pulse returning or backscattering from the target object 130 is received by the receiver 120.

The optical pulse returning from the target object 130 needs to be received by the receiver 120 in order to estimate the distance between the Lidar 100 and the target object 130. As such, the power of the optical pulse returning from the target object 130 also needs to be strong enough to reach at the receiver 120. The power of returning optical pulse $P_{rx}(t)$ is inversely proportional to the distance to the target object 130 from the Lidar 100 (i.e. $d_{target}$). Moreover, the power of returning optical pulse $P_{rx}(t)$ is linearly proportional to the power of emitted optical pulse $P_{tx}(t)$. This can be mathematically expressed as:

$$P_{rx}(t) \alpha \frac{P_{tx}(t)}{d_{target}^2}$$

As indicated by the mathematical expression above, there can be significant attenuation of the signal-to-noise ratio (SNR), especially for objects in long distances. On the other hand, SNR can be also boosted by increasing the power of emitted optical pulse $P_{tx}(t)$. As noted elsewhere herein, the increase of the power of emitted optical pulse $P_{tx}(t)$ is limited by the AEL for the eye safety purpose.

Figure 2A:
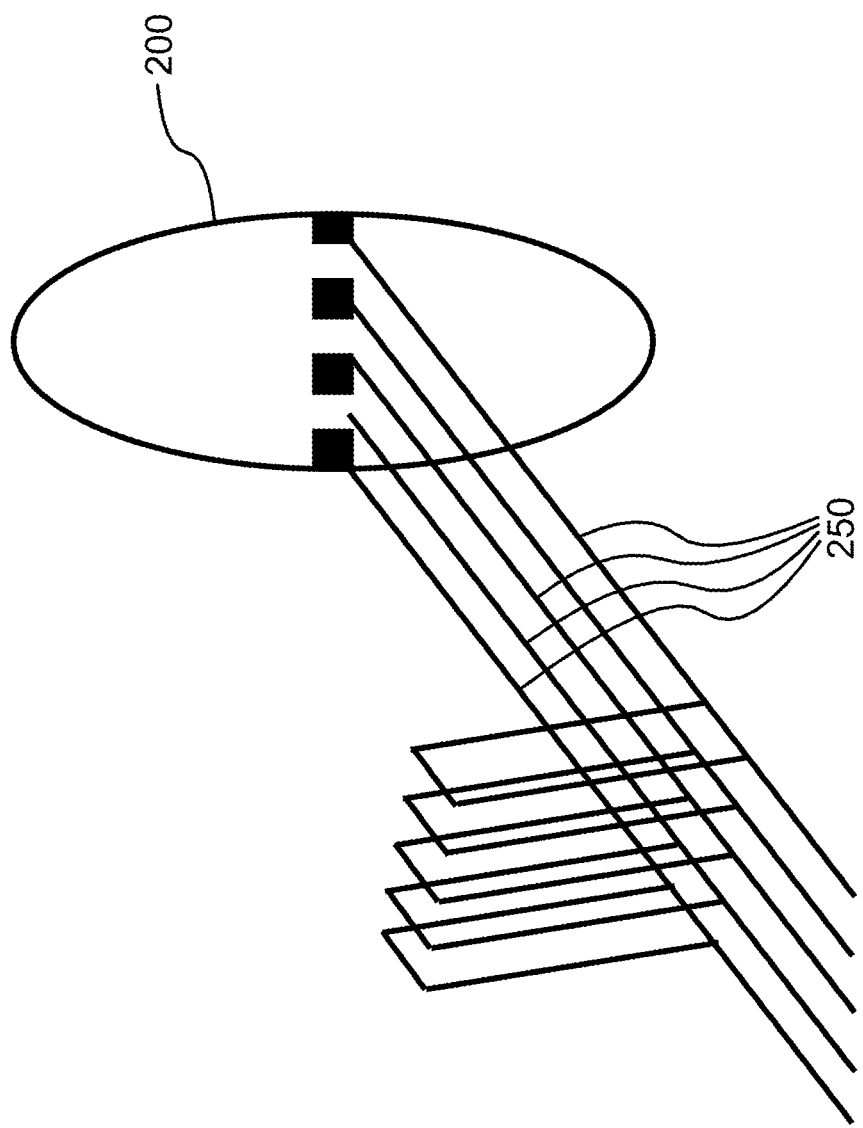
FIGS. 2A and 2B illustrate a human eye being exposed to a plurality of optical pulses while the Lidar is scanning a target object.

FIG. 2A illustrates a human eye 200 being exposed to a plurality of optical pulses 250 while the Lidar is scanning a target object. For eye safety, the total energy (or total power) of the optical pulses 250 received by the human eye 200 is limited by $AEL_{Total}$. At least in some embodiments, $AEL_{Total}$, which illustrates Accessible emission limits for Class 1 and Class 1M laser products and C6=1 in Australian/New Zealand Standard. FIG. 2C is a reproduction of Table 3 provided by Australian/New Zealand Standard. Referring to FIG. 2C, $AEL_{Total}$ based on an emission duration of the optical pulse. The emission duration of the optical pulse (T) can be determined as follows:

$$T = N/f$$

where N is the number of optical pulses received by the human eye per scan and f is the repetition rate of scanning optical pulse in Hertz (Hz).

According to the current state of the art, the energy per pulse $AEL_{per\ pulse}$ can be estimated by averaging $AEL_{Total}$, as follows:

$$AEL_{per\ pulse} = AEL_{Total}/N$$

where N is the number of optical pulses received by the human eye per scan.

Figure 2B:
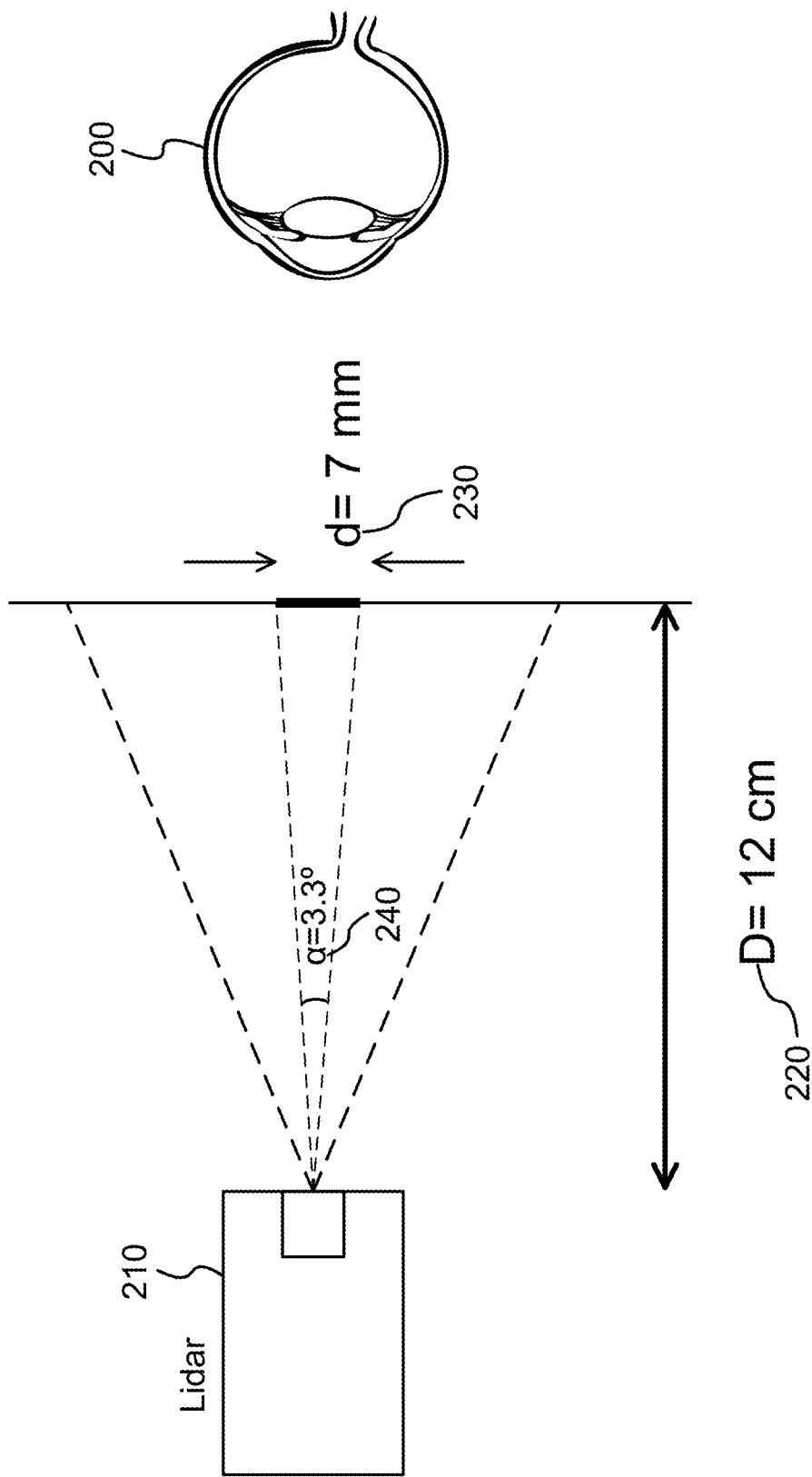
Figure 2C:
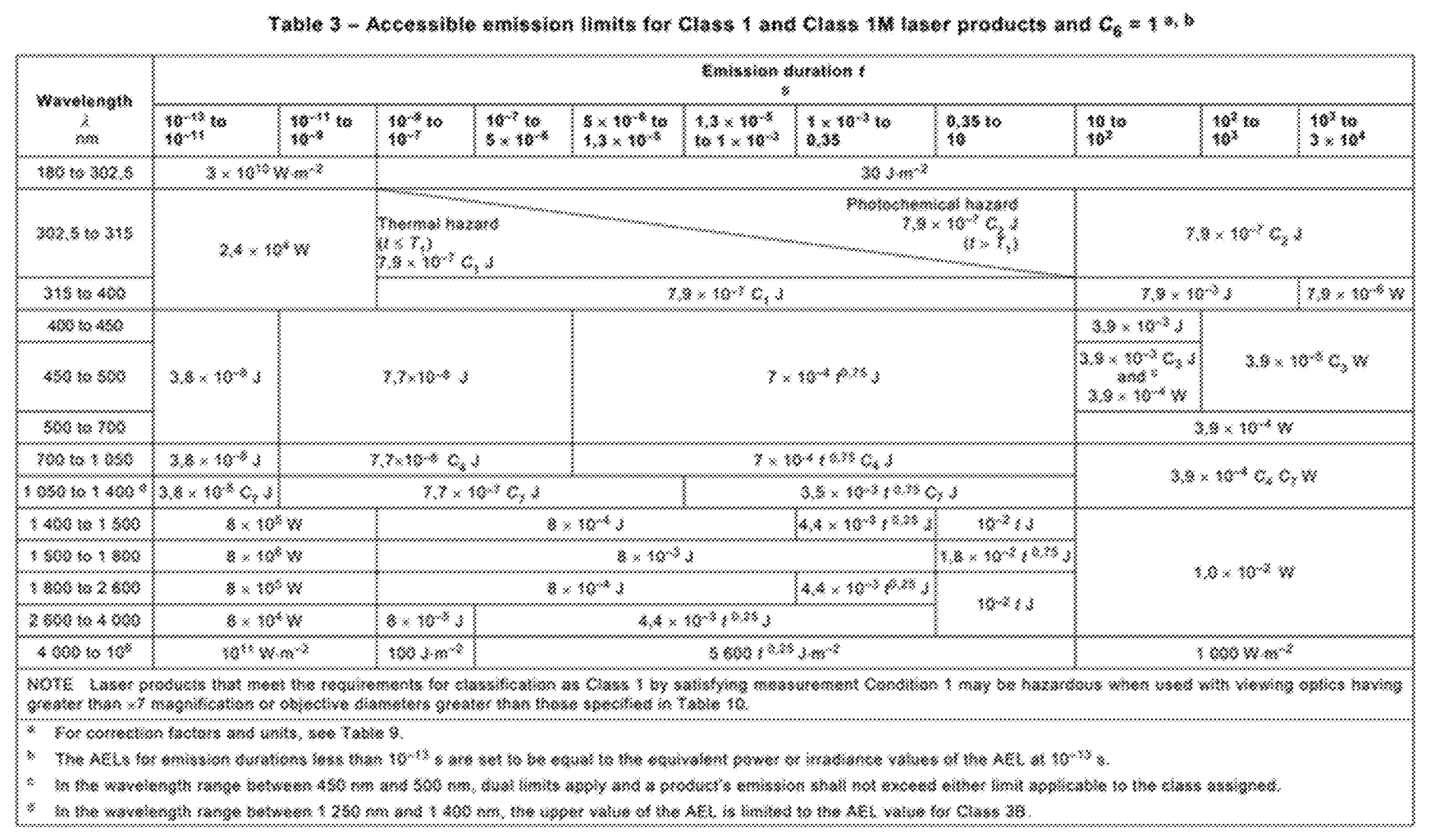

FIG. 2B illustrates a simulation to estimate $AEL_{Total}$, $AEL_{per\ pulse}$ and the number of pulses received by the human eye from the optical pulse detector (e.g. Lidar 210). Specifications of the optical pulse detector (Lidar 210) used in this simulation are provided in Table 1 below.

TABLE 1

| | |
|---|---|
| Repetition rate | 100 KHz |
| Horizontal Angular Resolution | 0.1° |
| Laser Wavelength | 905 nm |
| Pulse width | 5 nSec |

In order to determine the number of pulses N exposed to the human eye 200 at each scan, the exposure angle needs to be determined first. Referring to FIG. 2B, the exposure angle α 240 can be estimated using the distance D 220 between the Lidar 210 and the human eye 200 and the length d 230 as follows:

$$\alpha = \tan^{-1}\left(\frac{7\ mm}{12\ cm}\right) = 3.3°$$

It may be noted that the distance D 220 may refer to the minimum possible distance between the Lidar 210 and the human eye 200. The distance D 220 may be defined by eye safety standards (e.g. nationally defined standards, for example Australian/New Zealand Standard). It will be readily understood that other standards may be used to define these parameters. It may be also noted that the length d 230 represents the diameter of the pupil of the human eye 200. Once the exposure angle α 240 is determined, the number of optical pulses exposed to the eye 200 can be calculated using the horizontal angular resolution of the Lidar 210, as follows:

$$N = \frac{\text{Exposure angle}}{\text{Horizontal Angular Resolution}} = \frac{3.3}{0.1} = 33\ \text{Pulses}$$

Given the repetition rate (f) of the optical pulse emitted by the Lidar 210 (e.g. f=100 KHz), the total emission duration of the optical pulse from the Lidar 210 (T) needs to be calculated in order to determine $AEL_{Total}$. It should be noted that the repetition rate (f) may take other values as would be readily understood by a worker skilled in the art. Also, given that the total emission duration of the optical pulse (T) can be calculated by T=N/f, the total emission duration of the optical pulse T is equal to 330 μsec (i.e. 33 pulses/100 kHz=330 μsec).

With the total emission duration of the optical pulse T being calculated, $AEL_{Total}$ can be determined in accordance with FIG. 2C. According to FIG. 2C, $AEL_{Total}$ is $7 \times 10^{-4}\ t^{0.75}\ C_4$ J (Joule), given that the laser wavelength is 905 nm (note: 905 nm is in the range of 700 nm to 1050 nm) and the total emission time is 330 μsec (note: 330 μsec in the range of $1.3 \times 10^{-5}$ sec to $1 \times 10^{-3}$ sec). The parameter $C_4$ can be decided based on the wavelength of the optical pulse, in accordance with FIG. 2D, which illustrates correction factors and breakpoints for use in AEL and maximum permissible exposure (MPE) evaluations in Australian/New Zealand Standard. FIG. 2D is a reproduction of Table 9 provided by Australian/New Zealand Standard.

According to FIG. 2D, the parameter $C_4$ will be equal to $10^{0.002(\lambda-700)}$ when the laser wavelength is 905 nm (note: 905 nm is in the range of 700 nm to 1050 nm). As such, given the laser wavelength is 905 nm (i.e. λ=905 nm), the parameter $C_4$ will be equal to 2.57 (note: $10^{0.002(905-700)}$= 2.57).

Using the determined value of the parameter $C_4$, $AEL_{Total}$ can be calculated as follows:

$$AEL_{Total} = 7 \times 10^{-4} \times (330 \times 10^{-6})^{0.75} \times 2.57 = 4.4\ \mu J$$

The energy per pulse $AEL_{per\ pulse}$ can be estimated, in accordance with the current state of the art, by averaging $AEL_{Total}$, as specified below:

$$\text{energy per pulse} = AEL_{per\ pulse} = \frac{AEL_{Total}}{N} = \frac{4.4\ \mu J}{33} = 133.5\ nJ$$

Therefore, in accordance with the current technique that uses a uniform level of pulse power, the energy per pulse is limited by 133.5 nJ (i.e. 26.7 Watt peak power) where $AEL_{Total\ is}$ 4.4p and specifications of the optical pulse detector (e.g. Lidar) are as provided in Table 1 above.

FIG. 3 illustrates the probabilities of optical pulse detection in respect of various signal-to-noise ratios (SNR), upon estimation using an optical pulse detector, Neyman Pearson detector. FIG. 3 demonstrates the probability of pulse detection is extremely low when SNR is low, especially when SNR is lower than 5 dB.

Since the pulse power is inversely proportional to the distance to a target object, SNR for a remotely located object would be low as SNR is proportional to pulse power. As such, given that the probability of optical pulse detection is low when SNR is low, the quality (e.g. density) of the point clouds delivered by the TOF Lidar would be significantly deteriorated for objects in long distances. This clearly indicates that there is high possibility that a remotely located object is not appropriately detected (or not detected at all) by optical detectors (e.g. TOF Lidar).

Figure 4:
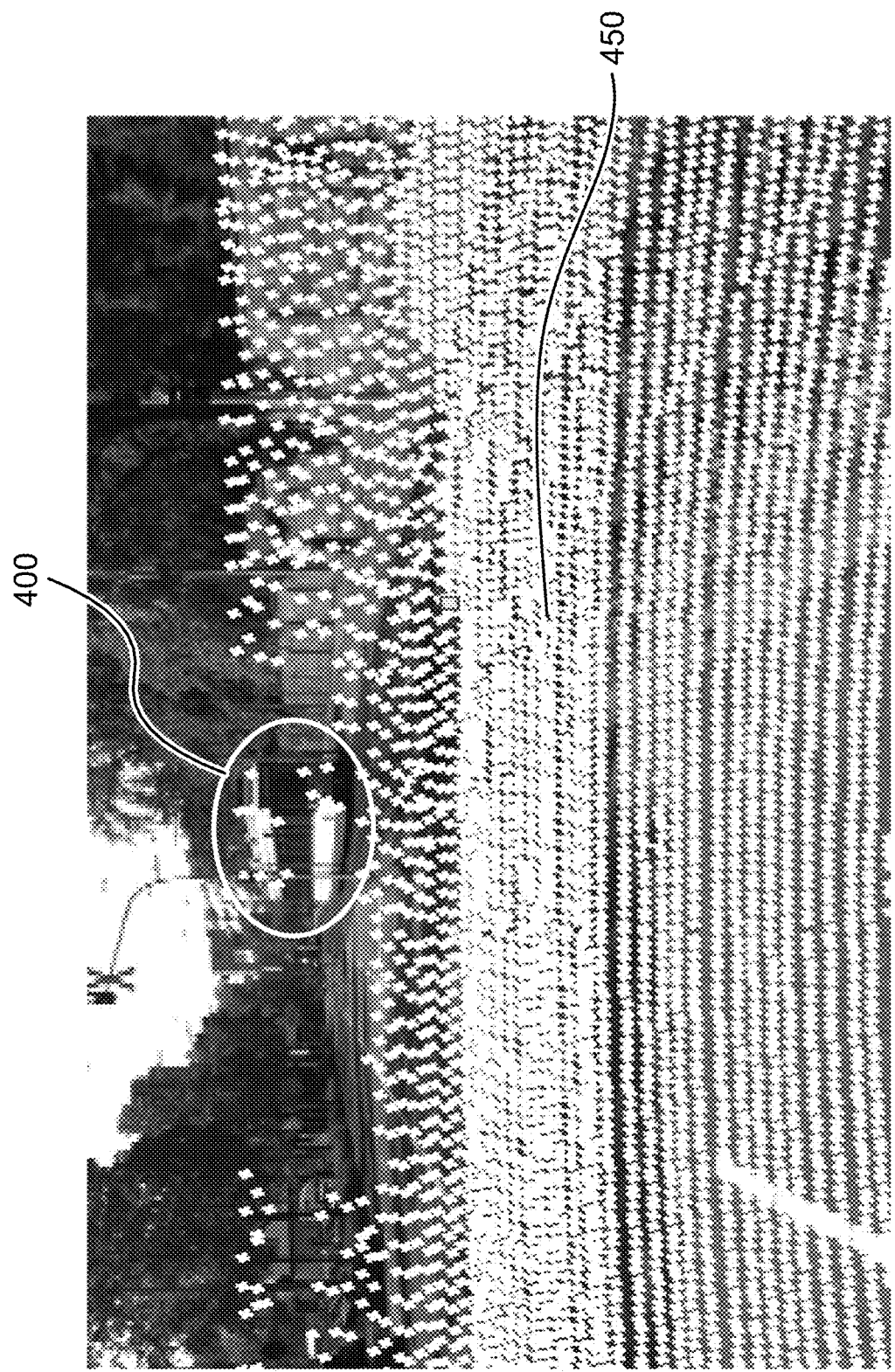
FIG. 4 illustrates point clouds for a remotely located object generated by an optical pulse detector using the current technology.

FIG. 4 illustrates point clouds for a remotely located object generated by an optical pulse detector using the current technology. Referring to FIG. 4, there are only few point clouds (i.e. low density of point clouds) for the train 400 as opposed to a high density of point clouds for the street 450. Low density of point clouds for the train 400 is not a desired result as the train 400 is a more important object that needs to be detected than the street 450 (e.g. for implementation of ADAS). The density of point clouds can be improved by increasing power of optical pulse emitted as the power of optical pulse is proportional to the probability of detecting a target object and the probability of detecting a target object is proportional to the density of point clouds associated with the target object. However, given that a uniform level of optical pulse power is emitted by the optical pulse detector (e.g. TOF Lidar), it may not be possible to increase power of the optical pulses due to the limitation imposed by the AEL, as such the density of point clouds may also not be improved using current technology for a remotely situated object.

Figure 5:
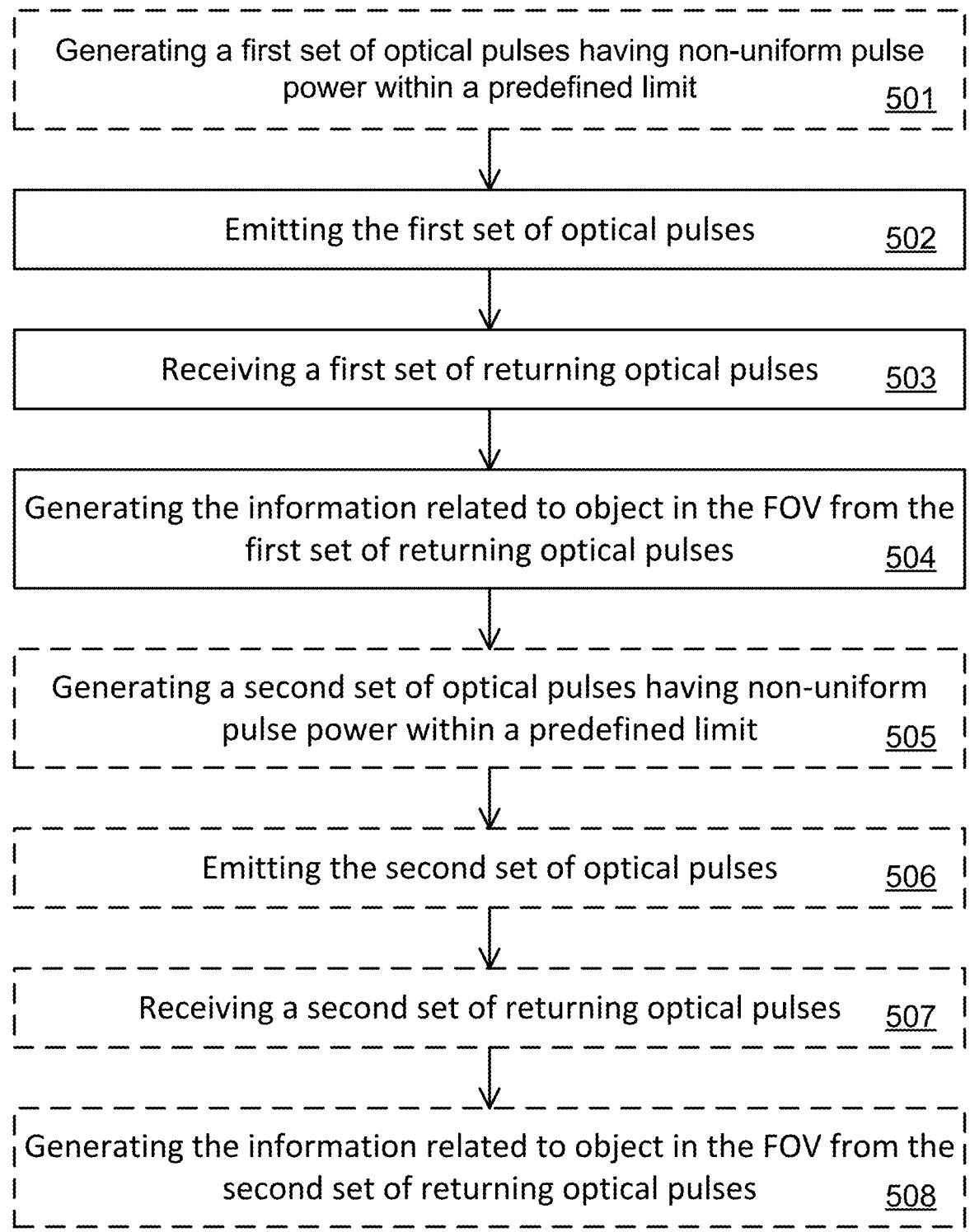
FIG. 5 illustrates a method for detecting a remotely located object in a FOV, in accordance with embodiments of the present disclosure.

FIG. 5 illustrates a method for detecting a remotely located object in a FOV, in accordance with embodiments of the present disclosure. Referring to FIG. 5, there may be provided a method 500 for detecting a remotely located object in a FOV using one or more sets of optical pulses (e.g. laser pulses) with non-uniform optical pulse power. The per-pulse power of the first set of optical pulses is less than or equal to a predefined limit, such as a per-pulse AEL (e.g. average of total AEL). In some embodiments, at step 501, a first set of optical pulses (e.g. laser pulses) may be generated by optical pulse generators. The generated optical pulses have non-uniform pulse power. For instance, the first set of optical pulses may include one or more optical pulses with a first optical pulse power and one or more other optical pulses with a second optical pulse power. The first optical pulse power and the second optical pulse power are different from each other. The first optical pulse power and the second optical pulse power may be adjustable.

In some embodiments, the optical pulse generators are included in the device that detects an object in a FOV. In some other embodiments, the optical pulse generators are not included in the device that detects an object in a FOV but are external optical pulse generators.

According to embodiments, when a set of optical pulses with non-uniform pulse power are generated at step 501, the generated set of optical pulses, at step 502, may be emitted by one or more optical pulse transmitters. The one or more optical pulse transmitters may be part of a device that detects an object in a FOV. At step 503, one or more optical pulse receivers may receive a set of optical pulses returning or backscattering from the object (e.g. target object) in a FOV. The one or more optical pulse receivers may be part of the device that detects the object in a FOV. According to embodiments, the returning sets of optical pulses (e.g. a set of optical pulses returning from the target object) may be indicative of information related to the object in the FOV. Once the set of returning optical pulses are received, at step 504, the information related to the object in the FOV may be generated from the returning optical pulses. The information related to the object may include three-dimensional information like point clouds representing the object in the FOV. While not shown in FIG. 5, in some embodiments, the generated information may be delivered to other external device.

According to some embodiments, steps 505 to 508 may be optionally performed in a similar or the same manner as steps 501 to 504. The additional steps 505 to 508 may increase the probability of detecting a target object that is remotely located in a FOV.

Now further referring to FIG. 5, at step 505, in addition to the first set of optical pulses generated at step 501, a second set of optical pulses (e.g. laser pulses) may be generated by optical pulse generators. The second set of optical pulses generated at step 505 may also have non-uniform pulse power. The per-pulse power of the second set of optical pulses is less than or equal to a predefined limit, such as a per-pulse AEL (e.g. average of total AEL). Those skilled in the art may appreciate that the second set of optical pulses may be different from the first set of optical pulses generated at step 501. For instance, the second set of optical pulses may include one or more optical pulses with a third optical pulse power and one or more other optical pulses with a fourth optical pulse power. The third optical pulse power and the fourth optical pulse power are different from each other. However, the third optical pulse power or the fourth optical pulse power may be same as one of the first or second optical pulse power. The third optical pulse power and the fourth optical pulse power may be adjustable.

In some embodiments, the optical pulse generators are included in the device that detects an object in a FOV. In some other embodiments, the optical pulse generators are not included in the device that detects an object in a FOV but are external optical pulse generators.

According to embodiments, when the second set of optical pulses are generated at step 505, the second set of optical pulses, at step 506, may be emitted by the one or more optical pulse transmitters, as in step 502. At step 507, the optical pulse receivers may receive a set of optical pulses returning or backscattering from the object (e.g. target object) in a FOV, as in step 503. According to embodiments, the second returning sets of optical pulses (e.g. a second set of optical pulses returning from the target object) may be also indicative of information related to the object in the FOV. Once the set of returning optical pulses are received, at step 508, the information related to the object in the FOV may be generated from the second set of returning optical pulses. The information related to the object may include three-dimensional information like point clouds representing the object in the FOV. While not shown in FIG. 5, in some embodiments, the generated information may be delivered to other external device.

Figure 5B:
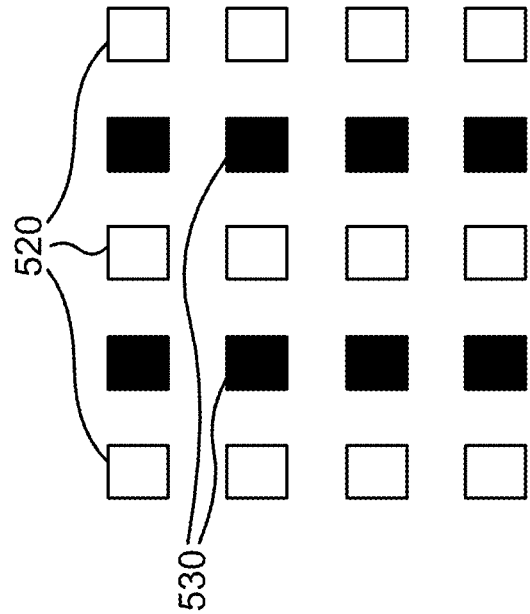
FIGS. 5B to 5D illustrate emitting schemes of the optical pulse detector detecting an object using optical pulses with non-uniform power, in accordance with embodiments of the present disclosure.
Figure 5D:
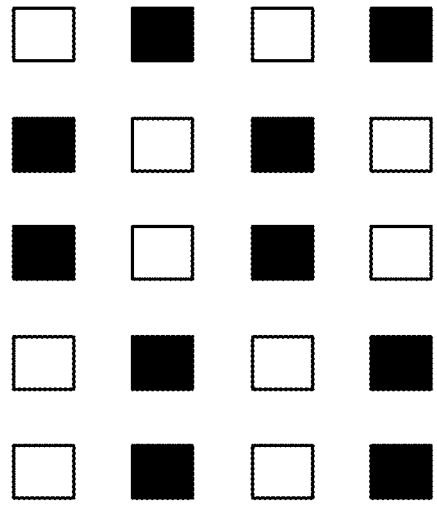
Figure 5A:
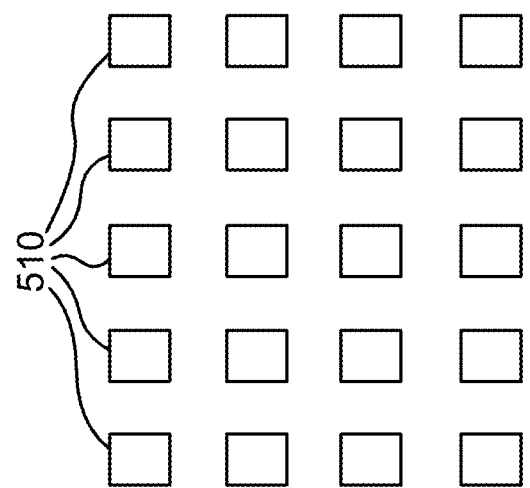
FIG. 5A illustrates a typical emitting scheme of an optical pulse detector in the conventional technology.

FIG. 5A illustrates a typical emitting scheme of an optical pulse detector in the conventional technology. Referring to FIG. 5A, each square, each of the pixels 510, represents a scanned pixel of the conventional optical pulse detectors emitting optical pulse with uniform level of pulse power (pulse energy). The pulse power of the emitted optical pulse may be equal to the average of total AEL (i.e. $AEL_{per\ pulse} = AEL_{Total}/N$). In other words, each pulse equally has the pulse power of $AEL_{per\ pulse} = AEL_{Total}/N$, in the current technology.

Figure 5C:
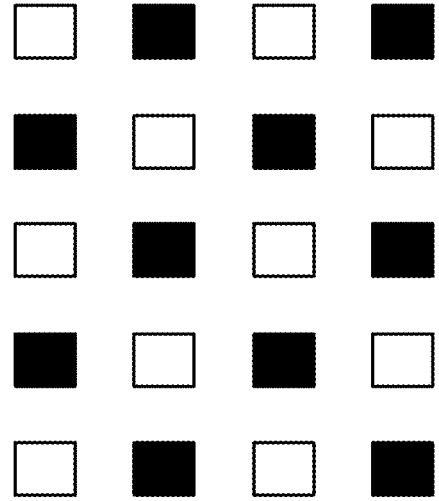

On the other hand, according to embodiments, a new method of detecting an object uses optical pulses with non-uniform power, as opposed to the current technology. FIGS. 5B to 5D illustrate emitting schemes of the optical pulse detector adopted for the new method of detecting an object using optical pulses with non-uniform power, in accordance with embodiments of the present disclosure.

Referring to FIG. 5B, the squares arranged in the leftmost column, the center column and the rightmost column are the pixels 520, and the squares arranged in the remaining columns (i.e. the second leftmost column and the second rightmost column) are the pixels 530. Each of the pixels 520 represents a scanned pixel of the optical pulse detectors emitting optical pulse with pulse power (pulse energy) greater than uniform level of pulse power (i.e. uniform energy level) used in FIG. 5A. It is noted that the pulse power level of FIG. 5A equates to the average of total AEL (i.e. $AEL_{per\ pulse} = AEL_{Total} N$). On the other hand, each of the pixels 530 represents a scanned pixel of the optical pulse detectors emitting optical pulse with pulse power (pulse energy) less than uniform level of pulse power (i.e. uniform energy level) used in FIG. 5A.

According to embodiments, the new method uses two or more levels of pulse power for pixels in the field of view. The two or more levels of pulse power (i.e. non-uniform pulse power) in the emitted optical pulses are constrained by the following conditions:
 a. $AEL_{Total}$ for non-uniform pulse power equates to $AEL_{Total}$ for uniform pulse power (i.e. $AEL_{Total}$ does not change); and
 b. Maximum pulse power is limited by $AEL_{per\ pulse}$ for the pulse period.

It should be noted that patterns of pulse power distribution other than provided in FIG. 5B can be employed in various embodiments. For example, FIGS. 5C and 5D provide different power schemes (e.g. patterns for the pulse power distribution) used by optical pulse detectors. According to embodiments, various schemes using optical pulses with non-uniform power can be adopted for the new method of detecting an object.

It should be also noted that while embodiments with optical pulses having two levels of pulse power are only illustrated in this disclosure for simplicity, more than two levels of pulse power can be used in other embodiments as long as the constraining conditions above are met.

According to embodiments, the optical pulse detectors may scan the FOV more than once and may use multiple power schemes (e.g. patterns for the pulse power distribution) when scanning the FOV. For instance, for the first scan, the transmitter of the optical pulse detector may emit optical pulses using the power scheme of FIG. 5B. Then, for the second scan, the emitter of the optical pulse detector may transmit optical pulses based on inverse pattern of the power scheme shown in FIG. 5B. Alternatively, for the second scan, the transmitter of the optical pulse detector may emit optical pulses based on the non-uniform power scheme shown in FIG. 5C or FIG. 5D. Non-uniform power schemes with different patterns (e.g. the pattern that is shifted by one column from FIG. 5D) can be also used when scanning the FOV.

As stated above, in various embodiments, two or more levels of pulse power can be integrated with the optical pulses based on a power scheme for detecting an object. For example, two levels of pulse power can be integrated with the optical pulses as in the binary power schemes of FIGS. 5B to 5D. $AEL_{Total}$ for the non-uniform pulse power (i.e. pulse power with two pulse power levels) equates to $AEL_{Total}$ for the uniform pulse power (i.e. $AEL_{Total}$ does not change). Also, maximum pulse power per single pulse is limited by $AEL_{per\,pulse}$ for the pulse period.

Calculation for the two levels of pulse power will be further illustrated with specific simulation example. For the purpose of this simulation, it is assumed that the optical pulse detector with the specifications provided in Table 1 above is used.

According to embodiments, given the optical pulse detector with the specifications in Table 1, the maximum pulse power level for a single pulse can be determined using the pulse width. Since the pulse width is 5 nsec in this simulation example, the emission time would be at least 5 nsec for the optical pulse. Given that $AEL_{per\,pulse}$ is being determined here to limit the maximum pulse power level for a single pulse, the emission time would be 5 nsec as 5 nsec would the minimum emission time required (i.e. the pulse width). Given that the laser wavelength is 905 nm (i.e. 905 nm is in the range of 700 nm to 1050 nm) and the emission time is 5 nsec (i.e. 5 nsec in the range of $10^{-9}$ sec to $10^{-7}$ sec), the maximum AEL for a single pulse would be $7.7 \times 10^{-8}$ $C_4$ J (Joule), according to FIG. 2C. Given that the laser wavelength is 905 nm (i.e. 700 nm<$\lambda$=905 nm<1050 nm), the parameter $C_4$ will be equal to 2.57 (i.e. $10^{0.002(\lambda-700)} = 10^{0.002(905-700)} = 2.57$) according to FIG. 2D. Consequently, the maximum AEL for a single pulse would be approximately 200 nJ (i.e. 40 Watt peak power) based on the calculation shown below:

$$AEL_{per\,pulse} = 7.7 \times 10^{-8} \times 2.57 \approx 200\text{ nJ}$$

As noted above, according to embodiments, the two levels of pulse power (i.e. non-uniform pulse power) in the emitted optical pulses are constrained by the following conditions:
   a. $AEL_{Total}$ for non-uniform pulse power equates to $AEL_{Total}$ for uniform pulse power (i.e. $AEL_{Total}$ does not change); and
   b. Maximum pulse power is limited by $AEL_{per\,pulse}$ for the pulse period.

Using one of the binary power schemes of FIGS. 5B to 5D, the pulse power levels of the optical pulses can be determined as follow, while complying with the two constraints above:
   L1≈200 nJ (i.e. 1.5 times uniform power level)
   L2≈67 nJ (i.e. 0.5 times uniform power level)

It is assumed that the number of pixels having the power level L1 is same as the number of pixels having the power level L2. Upon this assumption, the power level L2 can be determined as above in light of the first condition above (i.e. $AEL_{Total}$ for non-uniform pulse power equates to $AEL_{Total}$ for uniform pulse power).

It should be noted that there can be more than two pulse power levels depending on the power scheme adapted by the optical pulse detector (e.g. Lidar). For example, if a ternary power scheme is used, there would be three levels of pulse power which meet the above constraining conditions.

Figure 6:
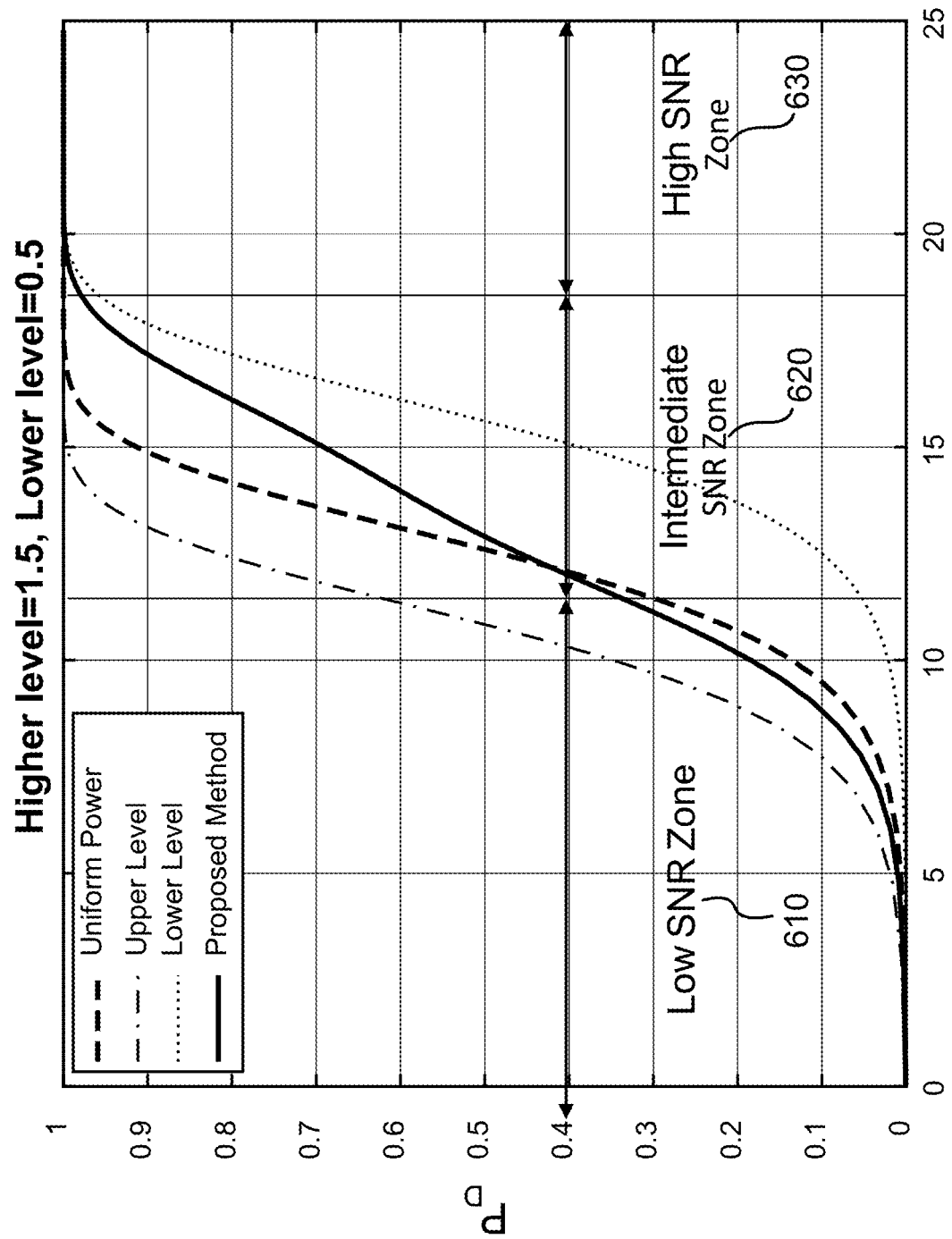
FIG. 6 illustrates the probability of object detection evaluated for both of the uniform pulse power scheme and the non-uniform pulse power scheme, in respect of various signal-to-noise ratios (SNR), in accordance with embodiments of the present disclosure.

Embodiments of the present disclosure may improve the probability of detecting remotely located objects in a FOV. FIG. 6 illustrates the probabilities of object detection evaluated for both of the uniform pulse power scheme and the non-uniform pulse power scheme, in respect of various SNRs. In FIG. 6, the probability of detection for the non-uniform pulse power scheme is calculated as the average of the probability of detection for both upper and lower levels of pulse power.

Referring to FIG. 6, the probabilities of detection for both of the uniform pulse power scheme and the non-uniform pulse power scheme converge to 1 when the value of SNR is in the high SNR zone 630. This indicates that there will be no missing pulses returning or backscattering from the target object that is located in a short distance. As such, the density of point clouds for the target object located in a short distance would be sufficiently high.

When the value of the SNR is within the intermediate SNR zone 620, the probability of detection for the non-uniform pulse power scheme is lower than the probability of detection for the uniform pulse power scheme (i.e. conventional technique). However, when the value of SNR is in the low SNR zone 610, the probability of detection for the non-uniform pulse power scheme is higher than the probability of detection for the uniform pulse power scheme.

While the non-uniform pulse power scheme may achieve higher probability of detection in the low SNR zone in exchange of lower probability of detection in the intermediate SNR zone, this would be beneficial especially when detecting a remotely located object is required. When the non-uniform pulse power scheme is used, the probability of detecting optical pulses returning or backscattering from the remotely located objects (i.e. objects corresponding to the low SNR) and the density of point clouds for such objects would be higher than when using the uniform pulse power scheme.

According to embodiments, various non-uniform pulse power schemes can be applied depending on the scanning scene or the importance of objects in the FOV. Further, pulse power level of the optical pulse can be adjusted depending on the scanning scene or the importance of objects in the FOV. The adjustment of the pulse power level would be particularly beneficial when scanning scenes with SNR in the range of the low SNR zone 610 and the intermediate SNR zone 620.

Figure 7:
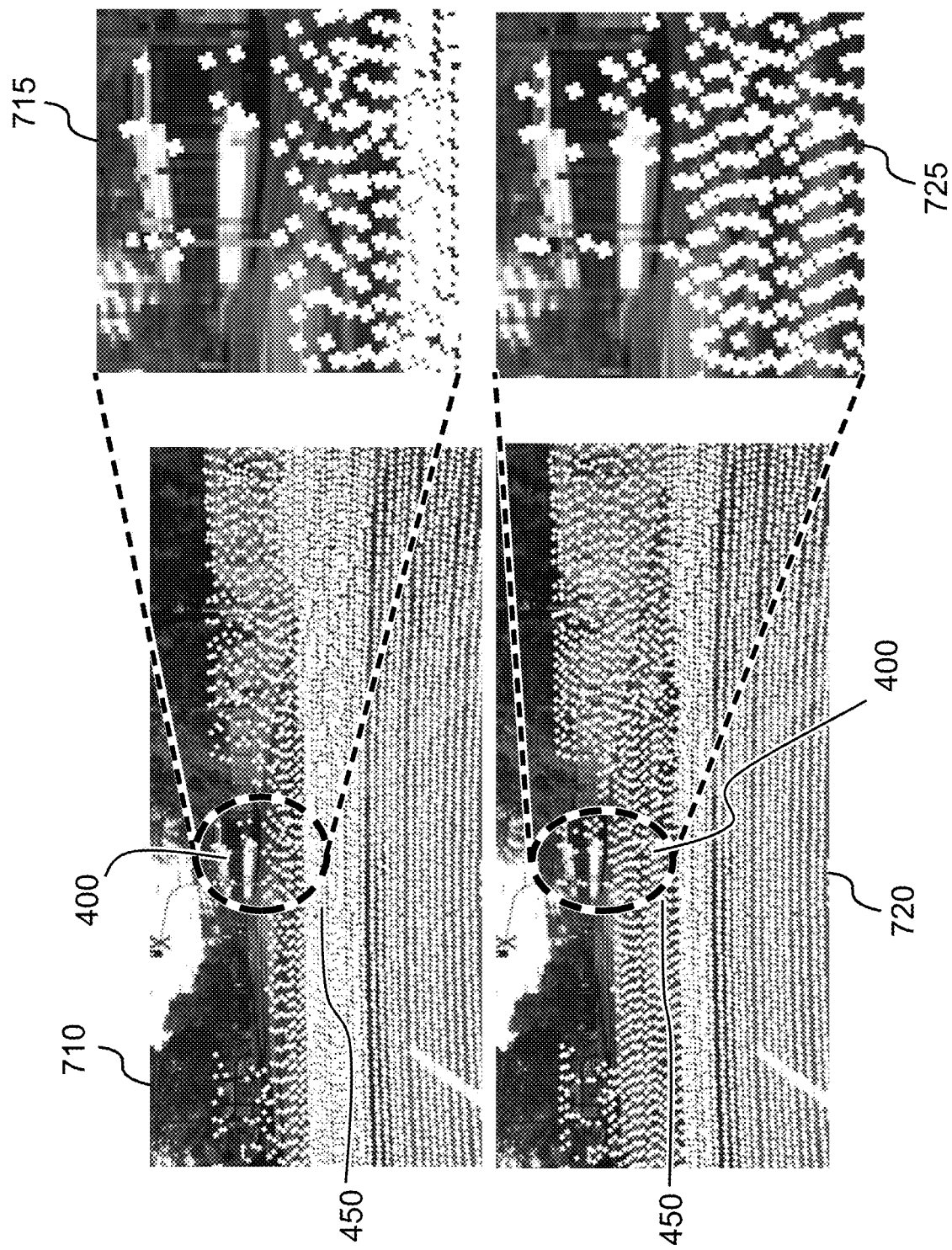
FIG. 7 illustrates point clouds generated for a remotely situated object using the conventional uniform pulse power scheme and the non-uniform pulse power scheme, in accordance with embodiments of the present disclosure.

FIG. 7 illustrates point clouds generated for a remotely situated object using the conventional uniform pulse power scheme and the non-uniform pulse power scheme. FIG. 7 suggests how the non-uniform pulse power scheme can be used to increase the density of point clouds of the remotely situated object (e.g. the train 400). The scenes 710 and 715 show point clouds generated for the train 400 using the conventional uniform pulse power scheme. The scenes 720 and 725 show point clouds generated for the train 400 using the non-uniform pulse power scheme.

Figure 8:
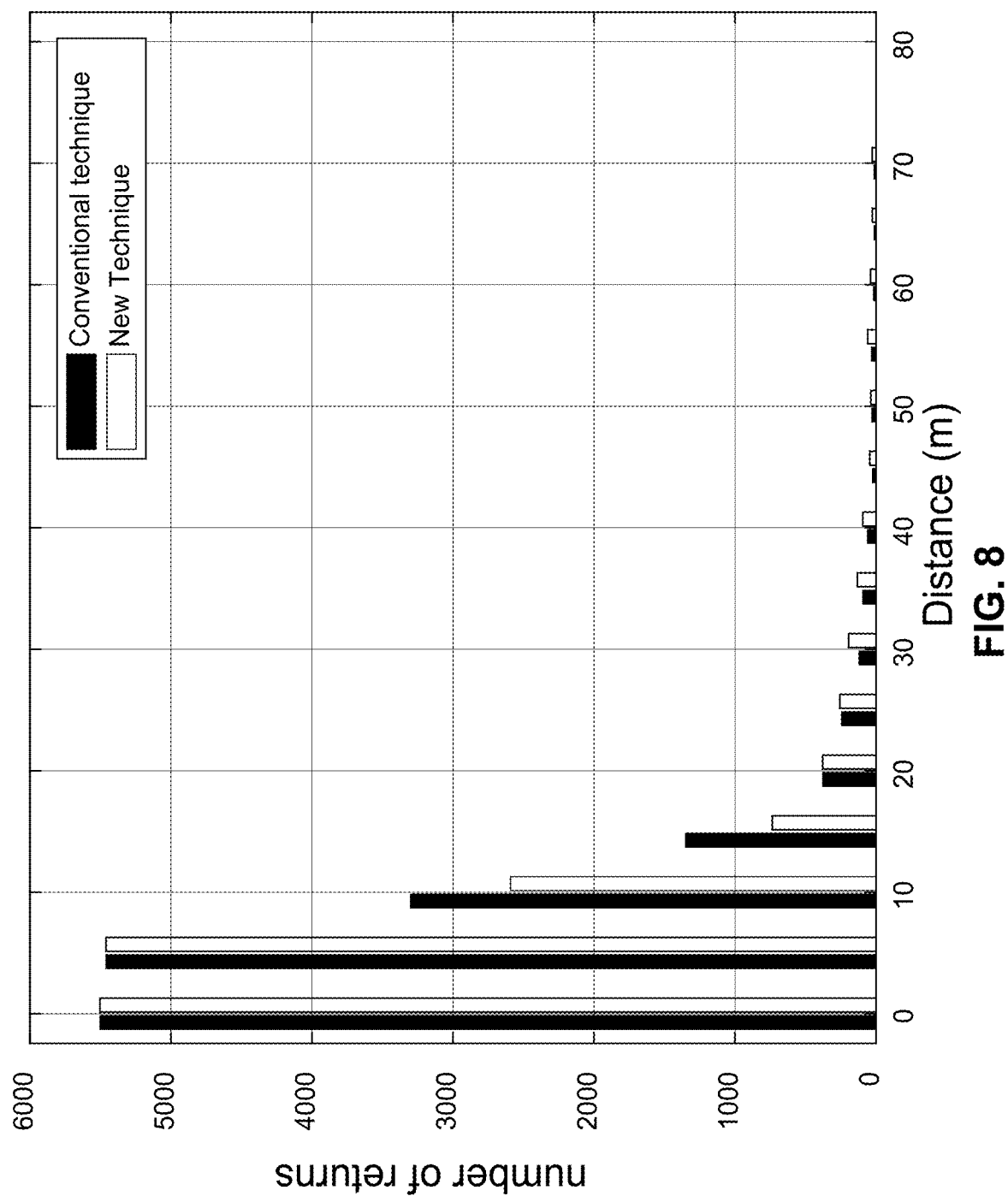
FIG. 8 is a numerical analysis for density of point clouds in respect of various distances for the conventional uniform pulse power scheme and the non-uniform pulse power scheme, in accordance with embodiments of the present disclosure.

FIG. 7 clearly demonstrates that the number of point clouds for the train 400 is significantly higher in the scenes 720 and 725, while the density of point clouds for the street 450 is higher in the scenes 710 and 715. Considering the train 400 is the targeted object thus more important object than the street 450, the non-uniform pulse power scheme may be preferred to use when scanning the FOV. The increased density of point clouds for remotely located objects, such as the train 400, may not be achieved with the conventional uniform pulse power scheme due to the limitation imposed by AEL A comparison for density of point cloud is numerally analyzed in FIG. 8. The graphs in FIG. 8 provide numerical analysis for density of point clouds in respect of various distances for the conventional uniform pulse power scheme and the non-uniform pulse power scheme.

Figure 9:
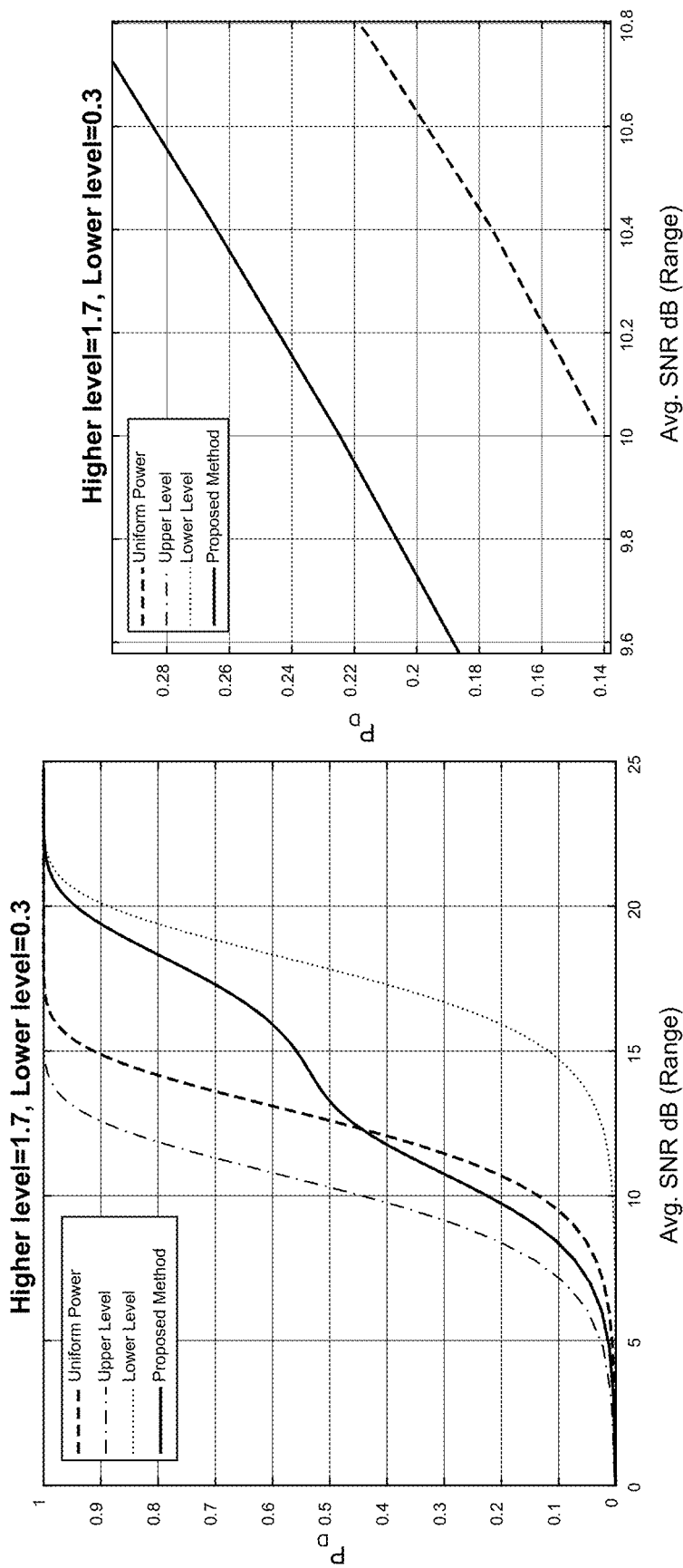
FIG. 9 illustrates the probability of object detection evaluated for both of the uniform pulse power scheme and the non-uniform pulse power scheme, in respect of various signal-to-noise ratios (SNR), in accordance with embodiments of the present disclosure.

The increased probability of detection for an object in a longer distance is indicative of increase in the maximum range of object detection. As shown in FIG. 9, using non-uniform pulse power scheme with pulse power levels of 1.7 and 0.3 (i.e. 1.7 times uniform power level and 0.3 times uniform power level), there will be 1 dB of SNR improvement when probability for detection ($P_D$) is 0.2. As the received power is inversely proportional with the distance square (i.e. $P_r \propto 1/d^2$), increasing the SNR by 1 dB would cause increase in maximum distance that the object can be detected. In a simulation, increasing the SNR by 1 dB led to 12% increase in the maximum distance range of object detection. The improvement in the lower SNR (e.g. SNR is 10 dB) indicates that the average of probability of detection with non-uniform power scheme is greater that the probability of detection with uniform pulse power scheme:

$$(P_{D(@Power\ Upper\ Level)} + P_{D(@Power\ Lower\ Level)})/2 \geq P_{D(@Uniform\ Power)}$$

According to embodiments, as stated above, non-uniform pulse power schemes may be used to increase the probability of detecting the optical pulses returning or backscattering from remotely located objects. The increased probability of detecting returning optical pulse would result in higher density of point clouds for the remotely located objects. Further, the maximum range for detecting an object in an FOV would become longer. The pulse power of the non-uniform pulse power scheme must meet the eye safety standards in terms of both per pulse AEL (for a single pulse) and total AEL (for a train of pulses) when scanning the field of view (FOV).

According to embodiments, the non-uniform pulse power schemes may improve the probability for detecting an object in other poor conditions. For example, embodiments of the present disclosure provide increased probability for detecting objects with low reflectivity or objects in poor weather conditions (e.g. fog and rain associated with high Atmospheric extinction coefficient). The pulse powers of the non-uniform power scheme may be adjusted depending on the scene or the location of important objects. Various embodiments of the present disclosure can be implemented using two or more optical pulse generators which may individually or collaboratively adjust optical power levels in a dynamic manner.

Figure 10:
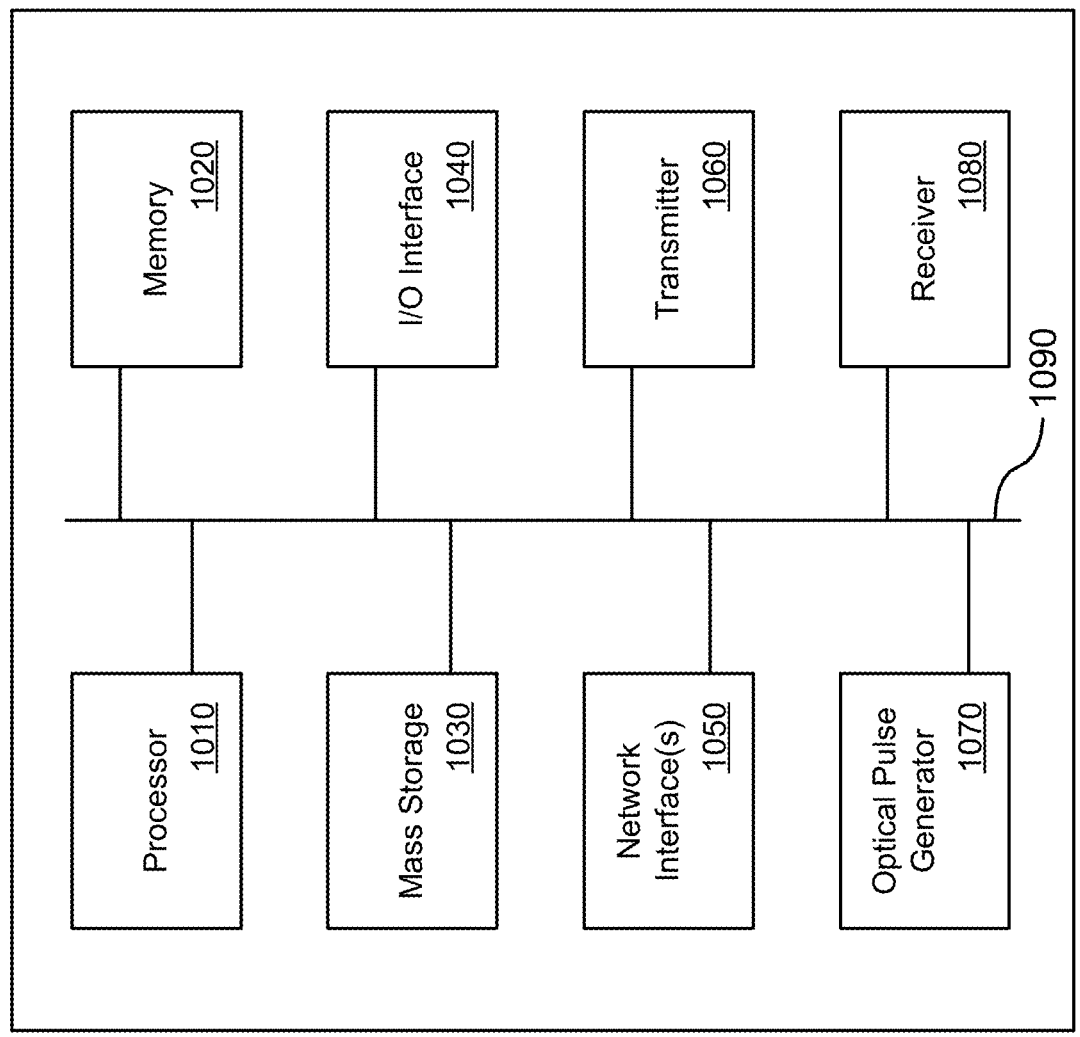
FIG. 10 illustrates, in a schematic diagram, an electronic device in accordance with embodiments of the present disclosure.

FIG. 10 is a schematic diagram of an electronic device 1000 for detecting an object in a field of view (FOV) that may perform any or all of operations of the above methods and features explicitly or implicitly described herein, according to different embodiments of the present invention. For example, a time of flight (TOF) Lidar device may be configured the device 1000.

As shown, the device includes a processor 1010, memory 1020, non-transitory mass storage 1030, I/O interface 1040, network interface 1050, an optical pulse transmitter 1060, an optical pulse generator 1070 and an optical pulse receiver 1080, all of which are communicatively coupled via bi-directional bus 1090. According to certain embodiments, any or all of the depicted elements may be utilized, or only a subset of the elements. In some embodiments, the device 1000 may contain one or more transceivers which perform operations of both the optical pulse transmitter(s) 1060 and an optical pulse receiver(s) 1080, instead of having optical pulse transmitter(s) and optical pulse receiver(s) separately. Further, the device 1000 may contain multiple instances of certain elements, such as multiple processors, memories, or transceivers. Also, elements of the hardware device may be directly coupled to other elements without the bi-directional bus.

The memory 1020 may include any type of non-transitory memory such as static random access memory (SRAM), dynamic random access memory (DRAM), synchronous DRAM (SDRAM), read-only memory (ROM), any combination of such, or the like. The mass storage element 1030 may include any type of non-transitory storage device, such as a solid state drive, hard disk drive, a magnetic disk drive, an optical disk drive, USB drive, or any computer program product configured to store data and machine executable program code. According to certain embodiments, the memory 1020 or mass storage 1030 may have recorded thereon statements and instructions executable by the processor 1010 for performing any of the aforementioned method operations described above.

The optical pulse transmitter(s) 1060 may emit a plurality of optical pulses having at least two levels of pulse power. For example, the optical pulses include a first optical pulse having a first pulse power and a second optical pulse having a second pulse power. The first pulse power is different from the second pulse power. The per-pulse power of the optical pulses is less than or equal to a predefined limit, such as a per-pulse AEL (e.g. average of total AEL). According to certain embodiments, the optical pulses may be optical pulses generated by the optical pulse generators 1070 or external optical pulse generator(s). In various embodiments, operations of the optical pulse transmitter(s) 1060 may be performed in accordance with statements and instructions executed by the processor 1010. For example, the pulse power level for the optical pulses emitted by the transmitter 1060 may be controlled by the statements and instructions executed by the processor 1010. Also, the exposure angle for the optical pulse to be emitted (e.g. the exposure angle α 240 presented above) may be controlled by the statements and instructions executed by the processor 1010. In some embodiments, the statements and instructions executed by the processor 1010 may be received by the network interface 1050 from an external controller.

According to certain embodiments, operations of the optical pulse generators 1070 may be performed in accordance with statements and instructions executed by the processor 1010. For example, the optical pulses may be generated by the optical pulse generators 1070 according to the statements and instructions executed by the processor 1010. In some cases, the pulse power level of the optical pulse may be determined by such statements and instructions. In some embodiments, the statements and instructions executed by the processor 1010 may be received by the network interface 1050 from an external controller.

The optical pulse receiver(s) 1080 may receive a plurality of returning optical pulses. The returning optical pulses are optical pulses returning or backscattering from the object in the FOV. The returning optical pulses may be indicative of information related to the object in the FOV. The information related to the object in the FOV may be generated by the processor 1010 from the returning optical pulses. The information related to the object may include three-dimensional information like point clouds representing the object in the FOV. In certain embodiments, the generated information may be delivered to other external device via the network interface 1050.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method of detecting an object in a field of view (FOV) comprising:
   emitting a first set of optical pulses, the first set of optical pulses including a plurality of first optical pulses each having a first pulse power and a plurality of second optical pulses each having a second pulse power, the first pulse power and the second pulse power being determined according to a non-uniform power scheme, the first pulse power being different from the second pulse power, each first optical pulse being directed to a respective first pixel of a repeating pattern of pixels of pulse power distribution, each second optical pulse being directed to a respective second pixel of the pattern of pixels of pulse power distribution, the repeating pattern of pixels of pulse power distribution being repeated one or more times across the FOV, the first set of optical pulses having a per-pulse power that is less than or equal to a predefined limit;
   receiving a first set of returning optical pulses, the first set of returning optical pulses indicative of information related to the object in the FOV; and
   generating the information related to the object in the FOV from the first set of returning optical pulses.

2. The method of claim 1, wherein the first pulse power is greater than the predefined limit.

3. The method of claim 1, further comprising:
   emitting a second set of optical pulses, the second set of optical pulses including a third optical pulse having a third pulse power and a fourth optical pulse having a fourth pulse power, wherein a per-pulse power of the second set of optical pulses is less than or equal to the predefined limit;
   receiving a second set of returning optical pulses, the second set of returning optical pulses indicative of information related to the object in the FOV; and
   generating the information related to the object in the FOV from the second set of returning optical pulses.

4. The method of claim 3, further comprising: generating the second set of optical pulses.

5. The method of claim 3, wherein one or more of the third pulse power and the fourth pulse power are adjustable.

6. The method of claim 1, further comprising: generating the first set of optical pulses.

7. The method of claim 1, wherein the first set of optical pulses are laser pulses.

8. The method of claim 1, wherein the second set of optical pulses are laser pulses.

9. The method of claim 1, wherein the generated information related to the object in the FOV includes three-dimensional information of the object in the FOV.

10. The method of claim 9, wherein the three-dimensional information includes point clouds representing the object in the FOV.

11. The method of claim 1, wherein the predefined limit is a per-pulse Accessible Emitted Limit (AEL).

12. The method of claim 1, wherein one or more of the first pulse power and the second pulse power are adjustable.

13. The method of claim 1, wherein a signal-to-noise ratio for each optical pulse of the first set of returning optical pulses is less than or equal to about 12 dB.

14. A device for detecting an object in a field of view (FOV) comprising:
   one or more optical pulse transmitters emitting a plurality of optical pulses including a plurality of first optical pulses each having a first pulse power and a plurality of second optical pulses each having a second pulse power, the first pulse power and the second pulse power being determined according to a non-uniform power scheme, wherein the first pulse power being different from the second pulse power, each first optical pulse being directed to a respective first pixel of a repeating pattern of pixels of pulse power distribution, each second optical pulse being directed to a respective second pixel of the pattern of pixels of pulse power distribution, the repeating pattern of pixels of pulse power distribution being repeated one or more times across the FOV, the optical pulses having a per-pulse power that is less than or equal to a predefined limit;

one or more optical pulse receivers for receiving a plurality of returning optical pulses, the returning optical pulses indicative of information related to the object in the FOV; and a processor for generating the information related to the object in the FOV from the returning optical pulses.

15. The device of claim 14, wherein the device is a time of flight (TOF) light detection and ranging (Lidar) device.

16. The device of claim 14, further comprising: one or more optical pulse generators for generating the optical pulses.

17. The device of claim 14, wherein the optical pulses are laser pulses.

18. The device of claim 14, wherein the generated information related to the object in the FOV includes three-dimensional information of the object in the FOV.

19. The device of claim 18, wherein the three-dimensional information includes point clouds representing the object in the FOV.

20. The device of claim 14, wherein the predefined limit is a per-pulse Accessible Emitted Limit (AEL).

21. The device of claim 14, wherein one or more of the first pulse power and the second pulse power are adjustable.

* * * * *

UNITED STATES PATENT AND TRADEMARK OFFICE
CERTIFICATE OF CORRECTION

PATENT NO. : 11,796,647 B2
APPLICATION NO. : 16/889582
DATED : October 24, 2023
INVENTOR(S) : Zhiping Jiang and Ali Ahmed Ali Massoud It is certified that error appears in the above-identified patent and that said Letters Patent is hereby corrected as shown below:

In the Specification

Column 5, Line 38:
"Given the repetition rate of (f)" should be --Given the repetition rate of ($f$)--

Column 5, Line 39:
"(e.g. f=100 KHz)," should be --(e.g. $f$=100 KHz)--

Column 5, Line 45:
"T=N/f," should be --T=N/$f$,--

Column 6, Line 16:
"4.4p and specifications" should be --4.4μJ and specifications--

Column 8, Line 38:
"AEL (i.e. $AEL_{per\ pulse}$ = AEL$_{Total}$N)." should be --AEL (i.e. $AEL_{per\ pulse}$ = AEL$_{Total}$ / N).--

Column 11, Line 30:
"--($P_{D(@Power\ Upper\ Level)}$ + $P_{D(@PowerLower\ Level)}$)/2 ≥ $P_{D(@Uniform\ Power)}$--" should be
--($P_{D(@Power\ Upper\ Level)}$ + $P_{D(@PowerLower\ Level)}$)/2 > $P_{D(@Uniform\ Power)}$--

Signed and Sealed this
Thirtieth Day of July, 2024

Katherine Kelly Vidal
*Director of the United States Patent and Trademark Office*